(12) United States Patent
Giboney et al.

(10) Patent No.: US 7,128,474 B2
(45) Date of Patent: Oct. 31, 2006

(54) OPTICAL DEVICE, ENCLOSURE AND METHOD OF FABRICATING

(75) Inventors: Kirk S. Giboney, Mountain View, CA (US); Jonathan Simon, San Leandro, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 432 days.

(21) Appl. No.: 10/007,494

(22) Filed: Nov. 13, 2001

(65) Prior Publication Data

US 2003/0091302 A1    May 15, 2003

(51) Int. Cl.
*G02B 6/36* (2006.01)
(52) U.S. Cl. .......................................... 385/92; 385/88
(58) Field of Classification Search ............ 385/88–92,
385/31, 33, 51, 52, 59, 64, 70, 74, 82, 101
See application file for complete search history.

(56) References Cited

U.S. PATENT DOCUMENTS

| | | | | |
|---|---|---|---|---|
| 5,109,453 A | * | 4/1992 | Edwards et al. ............... 385/90 |
| 5,138,680 A | * | 8/1992 | Briggs et al. .................. 385/90 |
| 5,452,390 A | * | 9/1995 | Bechtel et al. ................ 385/60 |
| 5,590,232 A | * | 12/1996 | Wentworth et al. ........... 385/92 |
| 5,671,311 A | * | 9/1997 | Stillie et al. .................... 385/60 |
| 5,768,456 A | * | 6/1998 | Knapp et al. .................. 385/49 |
| 6,056,448 A | * | 5/2000 | Sauter et al. .................. 385/89 |
| 6,168,317 B1 | * | 1/2001 | Shahid .......................... 385/59 |
| 6,234,687 B1 | * | 5/2001 | Hall et al. ...................... 385/88 |
| 6,238,100 B1 | | 5/2001 | Sasaki et al. .................. 385/59 |
| 6,331,079 B1 | * | 12/2001 | Grois et al. .................... 385/53 |
| 6,450,704 B1 | * | 9/2002 | O'Connor et al. ............. 385/52 |

FOREIGN PATENT DOCUMENTS

| | | |
|---|---|---|
| EP | 0 982 610 A2 | 3/2000 |
| EP | 1 028 338 A2 | 8/2000 |
| EP | 1 028 341 A2 | 8/2000 |
| JP | 2000206376 | 7/2000 |
| WO | WO 00/31771 | 6/2000 |

\* cited by examiner

*Primary Examiner*—Sung Pak
*Assistant Examiner*—Daniel Petkovsek

(57) ABSTRACT

An enclosure for an optical communications device having a lid portion and a base portion. Alignment members adapted to interface with an optical connector are formed on the lid portion. The lid portion is affixed to the base portion with a portion of the communications components therebetween. Multiple base portions formed in a unitary piece of material and multiple lid portions formed in another unitary piece of material can be affixed to one another, and then separated into individual devices to minimize time spent aligning each base and lid portion.

18 Claims, 5 Drawing Sheets

OPTICAL DEVICE, ENCLOSURE AND METHOD OF FABRICATING

BACKGROUND OF THE INVENTION

1. Technical Field of the Invention

The present invention relates to optical communication devices, and more particularly enclosures for optical communications devices that provide alignment between the optical communications device and an optical cable.

2. Description of Related Art

An optical interconnect module is an optical-electrical device that enables an interface between optical communications systems and electrical communications systems. One or multiple optical fibers, bundled in an optic cable, are connected to the interconnect module to communicate with optical-electrical components of the interconnect module. The optical-electrical components interface data transmitted on the optical fibers to electrical communication systems or interface electrical communications systems to optical communications systems.

An optical cable may need to be repeatedly connected and disconnected from the optical interconnect module. Because the optical fibers are generally very small, the alignment tolerance required to ensure that the fibers align with their respective optical and optical-electrical components is a few microns or less. The alignment tolerance must be reliably and repeatable achieved each time the optical fiber is reconnected to the optical interconnect module.

Referring to FIG. 1, an optical interconnect module 10 typically has a lid portion 12 and a base portion 14 which form the enclosure. The lid 12 joins with the base 14 to enclose and protect optical and optical-electrical components 22 (eg. an electro-optical transducer) from the exterior surrounding environment. Focusing elements 24 reside on the lid 12 to focus light from each optical fiber onto optical-electrical components 22 or light from the optical-electrical components 22 into an optical fiber. A ferrule 17 on the end of the optical cable 16 secures the optical cable to the lid 12 and aligns the optical fibers with their respective focusing elements 24. Thus, the ferrule 17 must be precisely positioned on the lid 12 so that the optical fibers align with their respective focusing elements 24, and the lid 12 must be precisely aligned with the base 14 so that focusing elements 24 are aligned with their respective optical-electrical components 22.

In one prior art interconnect module 10, guide pins 26 are received in pin retaining receptacles 28 of the base 14. The pin retaining receptacles 28 are positioned in precise relation to the optical-electrical components 22. The lid 12 has corresponding alignment apertures 30 through which pins 26 pass as the lid 12 is placed on base 14. The corresponding alignment apertures 30 are positioned in precise relation to focusing elements 24, so that focusing elements 24 are aligned with the optical-electrical components 22 when the lid 12 is placed on the base 14. The ferrule 17 has alignment receptacles 19 which closely receive the pins 26 to secure and align the optical cable 16 onto the lid 12.

To achieve the high connection tolerances required in the interconnect module 10, the components must each be fabricated with very high precision. Thus, the pins 26 are precision machined to fit closely within the alignment receptacles 19 of the ferrule 17. The retaining receptacles 28 are fabricated in the base 14 in precise relation to the optical-electrical components 22 and precisely spaced to match the spacing of the alignment receptacles 19 of the ferrule 17. The retaining receptacles 28 must also be precision registered with the pins 26. Finally, the alignment apertures 30 are fabricated in the lid 12 and in relation to the focusing elements 24, and then precision registered with the pins 26. This multi-step machining process is costly and time consuming, and is repeatedly performed for each lid and base. Extreme care must be taken to avoid a tolerance stack-up leaving the optical interconnect module out of tolerance.

It is desirable to reduce the time and expense involved in manufacturing optical interconnect modules. Thus, there is a need for lower cost optical interconnect module and a method of manufacturing the same with fewer high precision manufacturing steps.

SUMMARY OF THE INVENTION

The invention is drawn to optical communications device, such as an optical interconnect module, and a method of manufacturing the same that is less time consuming and less expensive to manufacture, because it needs fewer high precision manufacturing steps and can be manufactured in batch processes.

The invention encompasses an enclosure for an optical communications device that joins with a connector of an optical cable. The enclosure has a lid portion affixed to a base portion. The lid portion and the base portion are adapted to receive at least a portion of the optical communications device therebetween. At least one alignment member is formed on the lid portion and is adapted to be received by the connector.

The invention encompasses a method of fabricating optical interconnect devices having optical-electrical components for interfacing optical and electrical signals. The method includes forming two or more alignment members on a substrate. The substrate is affixed to a base material with at least a portion of the optical-electrical components therebetween. The substrate and base material are segmented into two or more optical interconnect devices, each having at least one alignment member.

An advantage of the invention is that it provides for an enclosure that is better suited for batch processing. For example, multiple lid portions can be formed into a single sheet of material and simultaneously joined to multiple base portions also formed in a single sheet of material. Thereafter lid and base pairs can be segmented from the whole to produce multiple individual devices.

Another advantage of the invention is that it provides for an enclosure that can be manufactured in a manner that minimizes the number of high precision manufacturing steps. For example, when multiple lid portions are simultaneously affixed to multiple base portions, as above, only one alignment step is required to align the multiple lid and base portions.

The above advantages and additional advantages will become apparent from the following detailed description when taken in conjunction with the accompanying drawings.

BRIEF DESCRIPTION OF THE DRAWINGS

Various objects and advantages of this invention will become apparent and more readily appreciated from the following description of the presently preferred exemplary embodiments and methods, taken in conjunction with the accompanying drawings of that.

DETAILED DESCRIPTION OF THE EXEMPLARY EMBODIMENTS OF THE INVENTION

Before embodiments of the invention are described in detail, it should be understood that the invention is not limited to the exemplary embodiments or the process steps of the exemplary methods described herein. One of ordinary skill in the art will readily appreciate that the examples described herein may be applied to many devices and sub-devices that are utilized in technologies involving optics.

Figure 1:
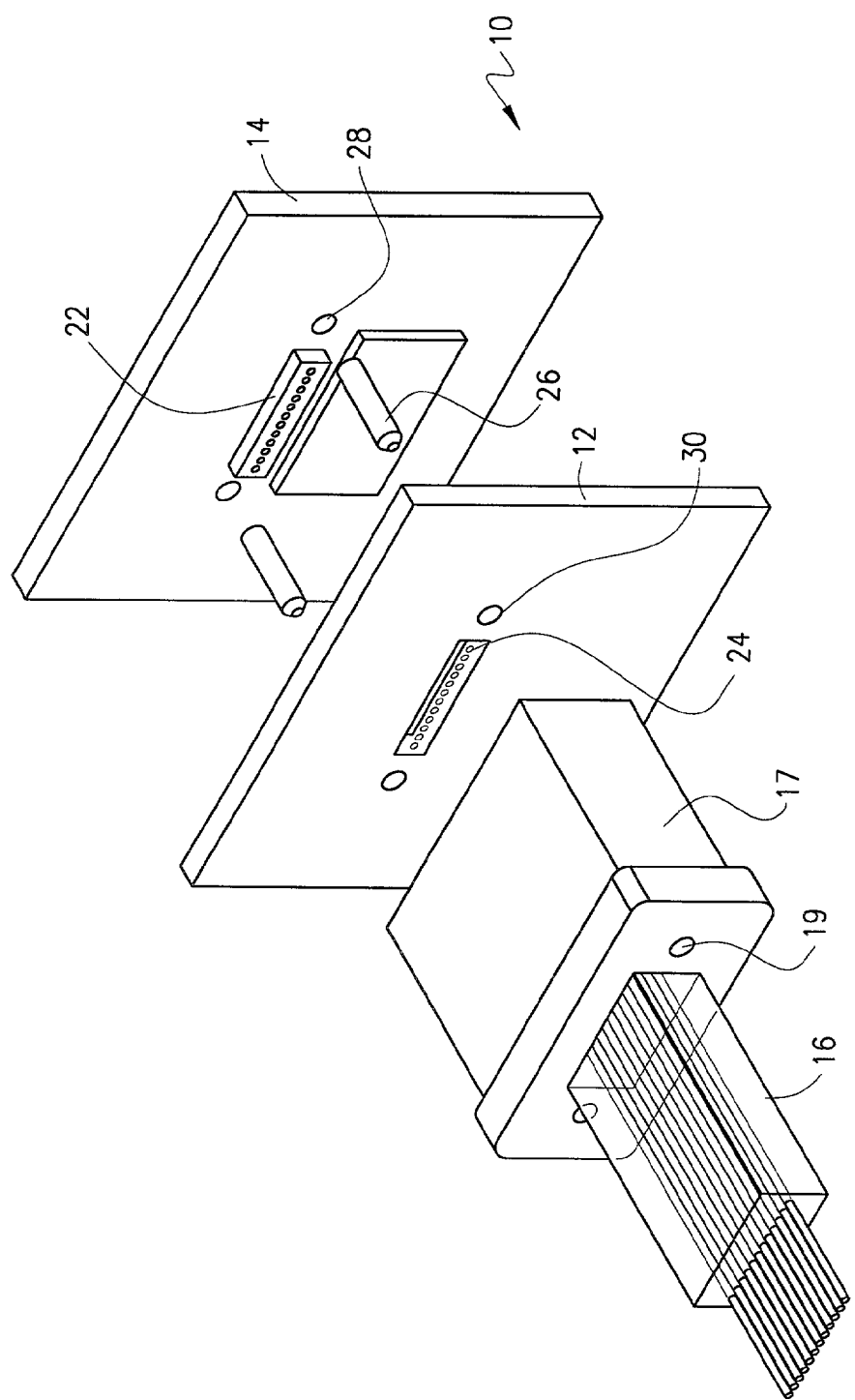
FIG. 1 is a exploded perspective view of a prior art optical interconnect module.
Figure 2A:
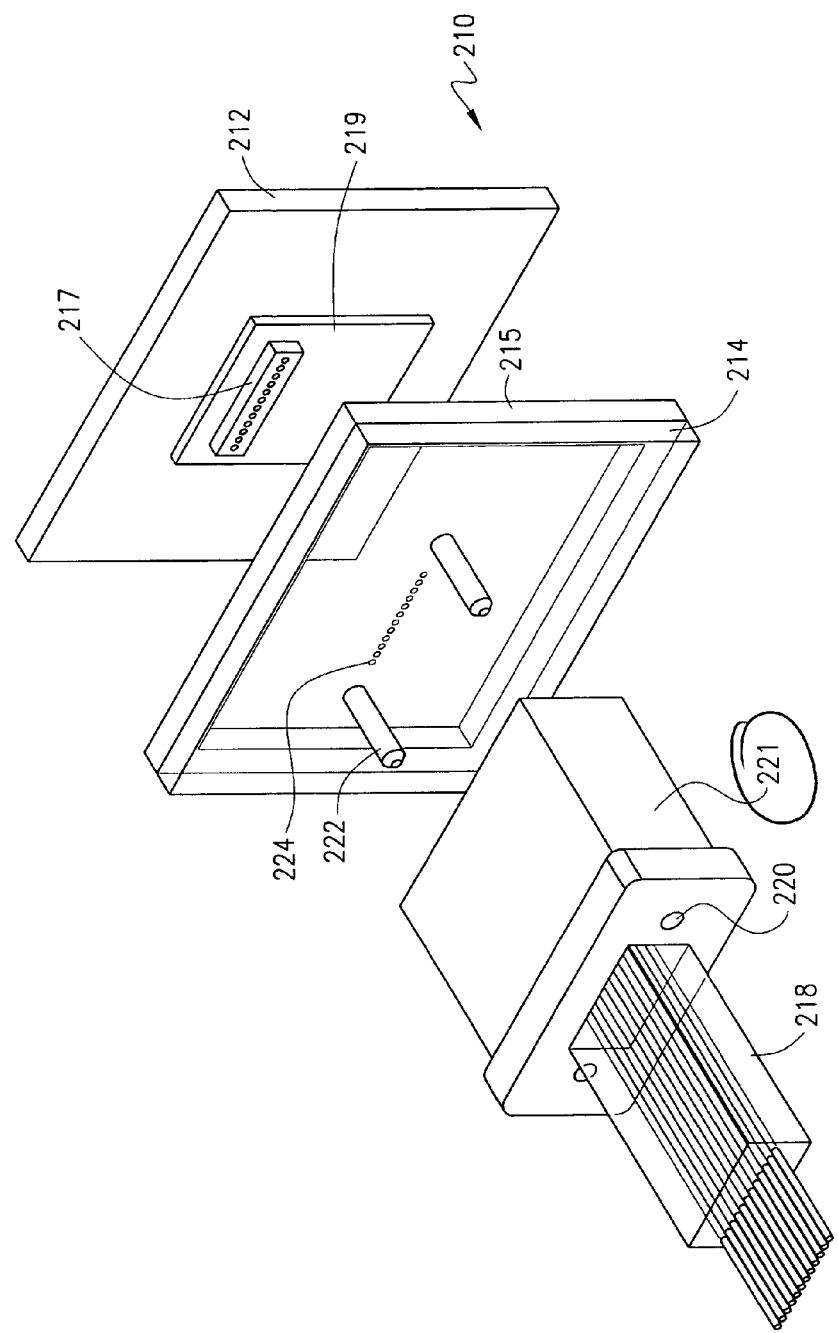
FIGS. 2A & B are exploded perspective views of two exemplary embodiments of optical interconnect modules employing enclosures constructed in accordance with the present invention.

Referring first to FIGS. 2A and B, an exemplary optical interconnect module 210 constructed in accordance with this invention has at least a base portion 212 and a lid portion 214 which forms the enclosure. The base 212 has optical-electrical (eg. an electro-optical transducer) 217 and electrical components 219 (eg. an integrated circuit) thereon for interfacing the optical signal carried by the optical cable 218 with an electronic signal. Alternately, the base 212 may be integrally formed with the electrical components 219 and have optical-electrical components 219 mounted thereon. The optical electrical 217 and the electrical components 219 are operably coupled. The lid 214 can be affixed to the base portion 212, and is recessed to receive the optical-electrical 217 and electrical components 219. The lid 214 also has optical elements 224. The optical-electrical components 217 can be positioned between the electrical components 219 and the lid 214, and more particularly between the electrical components 219 and the optical elements 224. As above, the optical cable 218 joins to the interconnect module 210 with a ferrule 221 that receives alignment members 222 in corresponding alignment receptacles 220.

In the embodiments depicted in FIGS. 2A and B, the lid 214 has alignment members 222 provided integrally thereon. Integral alignment members 222 need not be cylindrical pin shapes as discussed with reference to the prior art devices, but can be spherical, pyramid, cubic or virtually any shape and configuration that promotes alignment between the ferrule 221 and lid 214. The alignment receptacles 220 of the ferrule 221 have a corresponding shape to receive the alignment members and position the optical cable 218.

The base 212 is fabricated primarily by mounting the optical-electrical 217 and electrical components 219 onto or into a base material. Then, the electrical connections required for interfacing the optical-electrical 217 and electrical components 219 with each other and with an electrical communications output (not shown) can be made. The electrical communications output is one of many devices known in the art which allows other electrical devices to interface with the interconnect module 210, for example an RJ-45 network cable jack or PC board interface. The bases 212 can be fabricated singularly, or multiple bases 212 can be fabricated on a unitary section of base material (FIG. 2C) and parted after some or all of the fabrication is complete.

Figure 2C:
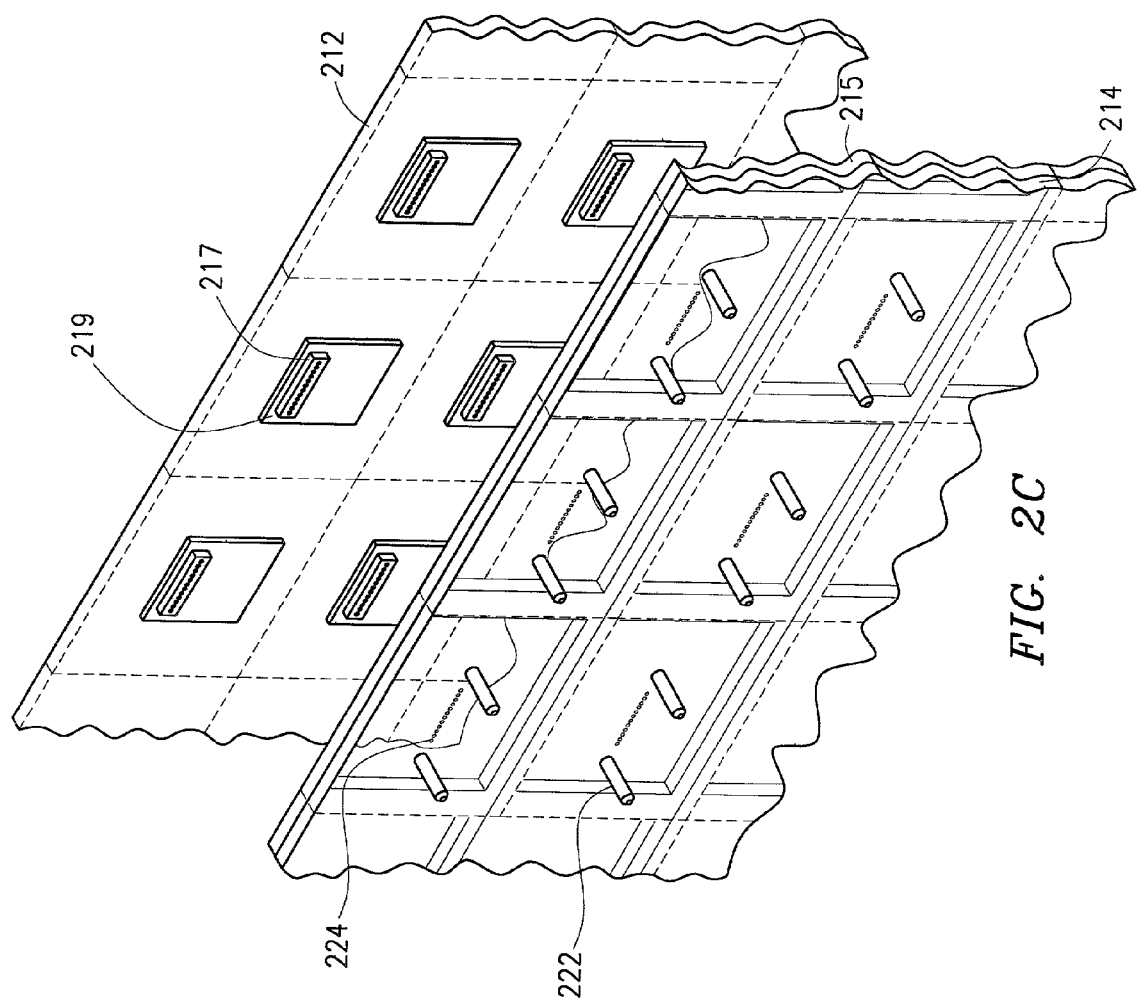
Figure 3:
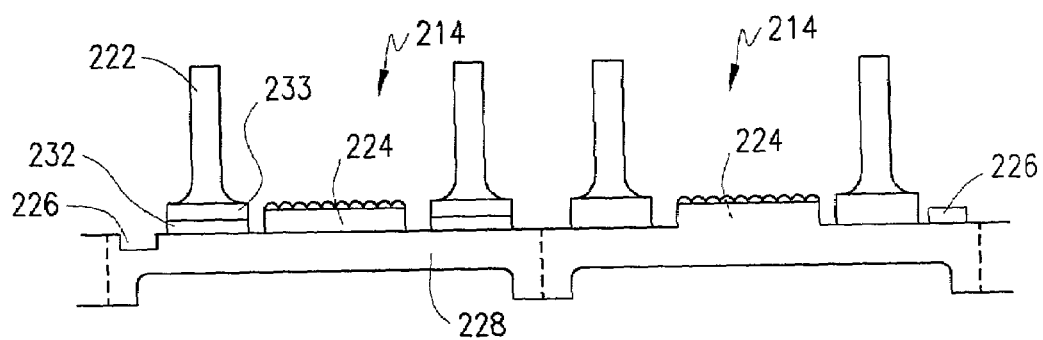
FIG. 3 is a side view of exemplary lids having alignment members affixed thereto in accordance with the present invention.

Referring to FIG. 3, an exemplary lid 214 is constructed from a substrate material 228. The substrate material may be a ceramic such as glass, glass-ceramic, or quartz, or can be virtually any other optically transparent material that allows the optical signal to be transmitted there through. Alternately, only a portion of the substrate material need be transparent. The substrate 228 can be sized to build a single lid 214, or multiple lids 214 (FIG. 2C). Preferably, the substrate 228 is sized to build multiple lids 214 allowing many of the processes described below to be performed as large batch processes. Performing the manufacturing processes as batch processes reduces the overall cost of the resultant device, because the processes can be performed repeatedly or simultaneously across a multiple lid substrate 228 minimizing the set-up time for each lid 214.

Optical elements 224, such as focusing elements adapted to focus light into or out of the optical fibers of the optical cable 218, are formed into the substrate material 228 when the substrate 228 is molded. Alternatively, the optical elements 224 can be pre-fabricated and attached to the substrate material 228 during or after the construction of other features on the lid 214. Methods for forming the optical elements 224 into the substrate 228 or attaching pre-fabricated optical elements 224 to the substrate are known in the art and virtually any method of forming and attachment can be used. Additionally, alignment fiducials 226 that aid in the placement of components, electrical, optical, optical-electrical, or otherwise, can be formed into or onto either surface of the lid 214.

The lid 214 can be recessed to accept the optical-electrical 217 and electrical components 219 of the base by forming lip members 215 (FIG. 2A) near its perimeter when the substrate 228 is molded. Alternately, the lip members 215 can be machined into the substrate 228 or prefabricated lip members 215 affixed to the substrate during or after the construction of other features on the lid 214.

The integral alignment members 222 can be formed by depositing a material onto the substrate 228. The material may be deposited in the desired shape for the integral alignment member 222. An exemplary material can be nickel deposited in a chemical vapor deposition (CVD) process, although one skilled in the art will appreciate that other metals and other materials in general can be combined with various deposition processes known in the art to achieve a similar result. A mold (not shown) can be used when depositing the material on the substrate 228 to ensure the precision and shape of the completed integral alignment member 222. Also, the deposited material can be precision shaped after deposition, whether or not a mold is used. The deposited material may be precision shaped by physical machining, laser techniques or other acceptable precision shaping techniques. In some situations it is desirable to deposit a preliminary metal layer 232 on the surface of the substrate 228 to facilitate bonding of the deposited materials with the substrate 228.

The integral alignment members 222 can also be formed from a curable or hardening material, such as a polymer resin or resin composite. The curable or hardening material bonds with the substrate 228 as it hardens. A mold (not shown) can be used to ensure the precision and shape of the completed integral alignment member 222. The cured or hardened material can also be shaped, whether or not a mold is used, by machining, laser techniques or other precision shaping techniques.

In another embodiment, the integral alignment members 222 can be pre-formed and affixed to the substrate 228. For example, the integral alignment members 222 can be pre-formed from a ceramic, such as glass or quartz, a polymer, or a metal and then bonded to the substrate 228. Metallic integral alignment members 222 can also be affixed to the substrate 228 by providing a preliminary metal layer 232 and ultrasonically or thermally welding the metallic integral alignment members 222 into position. The preliminary metal layer 232 can be shaped to act as an alignment fiducial that aids in the positioning of the integral alignment member 222 on the substrate 228. To provide increased area for bonding or welding, the integral alignment members 222 can be provided with a larger cross-sectional area where the integral alignment member 222 meets the substrate 228. Thus, in an embodiment where the integral alignment members 222 are pin shaped, each integral alignment member 222 can have a flared base portion 233 at that the bonding or welding takes place.

Figure 4:
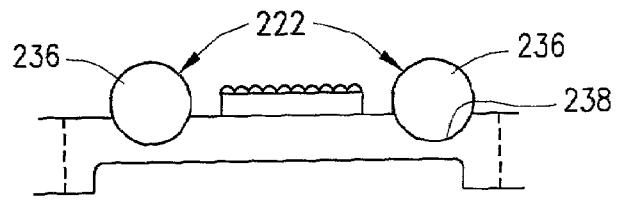
FIG. 4 is a side view of a lid having alignment members constructed from microspheres in accordance with the present invention.

In another example, as seen in FIG. 4, integral alignment members 222 can be pre-fabricated microspheres 236 set into recesses 238. The recesses ensure the desired positioning of the microspheres 234. The microspheres can be made of a ceramic such as glass, a polymer, or can be metal such as a ball bearing. Because microspheres are widely available commercially and generally manufactured in large quantities, this embodiment provides a very low cost source of pre-fabricated alignment members 222.

Figure 5A:
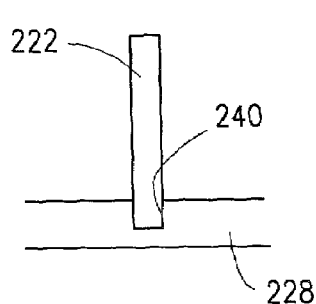
FIGS. 5A–B are side cross-sectional views of alignment members received in shaped recesses in accordance with the present invention.
Figure 5B:
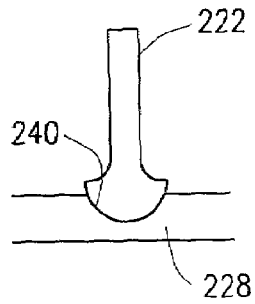

Referring to FIGS. 5A–B, the surface of the substrate 228 can be shaped to receive the base portions of pre-fabricated integral alignment members 222 or to receive for material to be deposited into in forming alignment member 222. The configuration can be designed to increase the contact area for bonding or welding in order to increase the strength of the attachment between the alignment member 222 and the substrate 228. The substrate surface can be shaped using photolithography techniques, wherein the substrate 228 is coated with photoresist, the photoresist exposed through a patterned mask, and the shapes etched (eg. deep-reactive-ion etching) through the resulting patterned photoresist. Using photolithography techniques can more precisely shape the substrate than mechanical processes. Recesses 240a, 240b can be of various configurations to promote precise positioning of the alignment members 222, whether formed from material built-up in the recesses or as pre-fabricated members. Additionaly, recesses 240a, 240b can have corresponding shapes to those on the integral alignment members 222, such as cylindrical (FIG. 5A), hemispherical or semi-hemispherical (FIG. 5B), or other shapes, such as pyramidal, octagonal, star-shaped, ovals or any other geometric configuration.

Figure 6:
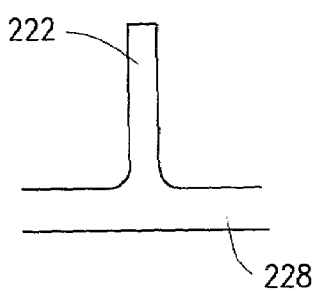
FIG. 6 is a side view of a lid having alignment members molded together with the substrate in accordance with the present invention.

FIG. 6 depicts an embodiment where the integral alignment members 222 are formed as part of the substrate material 228. In this embodiment, the integral alignment members 222 are molded with the substrate 228 or the substrate material 228 can be removed, such as by machining, to shape the integral alignment members 222. In another embodiment, the integral alignment members 222 can be etched from the substrate 228 or a deposited layer on the substrate 228 using photolithography techniques. For example, a photoresist is applied onto the substrate 228 and exposed in a pattern such that the substrate 228 can be etched to form alignment members 222 integrally thereon.

Figure 2B:
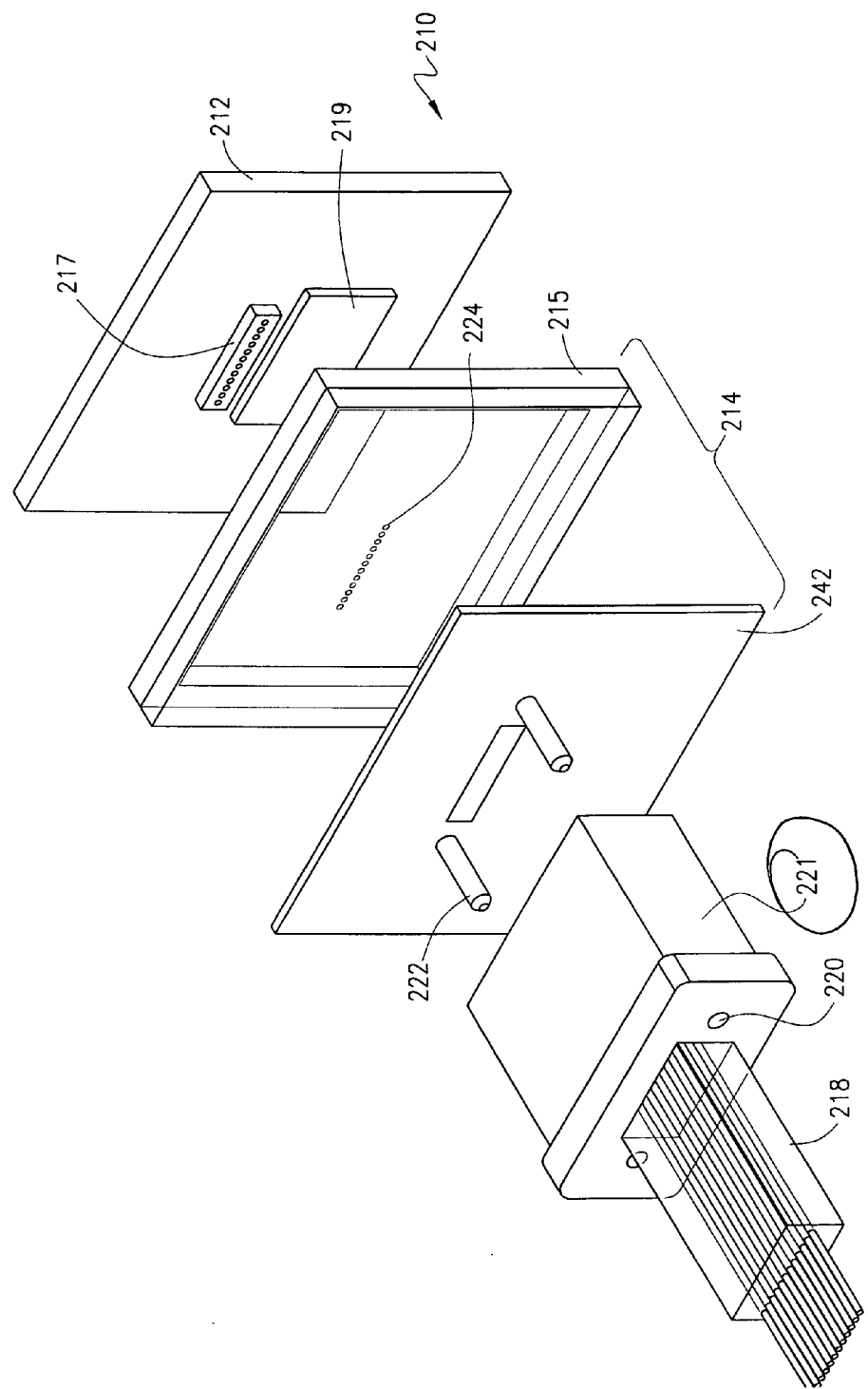
FIG. 2C is an exploded view of multiple bases and multiple lids in the construction of the optical interconnect of FIG. 2A.

As shown in FIG. 2B, an overlay 242 can be provided on which the integral alignment members 222 are bonded, welded, or formed as part of the overlay 242. The overlay 242 is affixed to the substrate 228, such as by bonding or welding to a preliminary metal layer on the substrate 228.

It may be desirable to choose materials for the base 212, lid 214 and alignment members 222 such that the expansion and contraction with temperature of these parts is substantially balanced or minimized. For example, the base 212, lid 214 and alignment members 222 can be constructed from a thermally stable glass having a low coefficient of thermal expansion.

To further reduce the number of high precision alignment steps required in the fabrication of the interconnect module 210, multiple base portions 212 fabricated from a single piece of material can be aligned and bonded to multiple lid portions 214 fabricated on a single substrate (FIG. 2C). Each base 212 and lid 214 pair can then be parted into their respective interconnect modules 210. If constructed in this manner, only one alignment step is required to align multiple lids 214 with their respective bases 212, whereas otherwise each lid 214 would have to be aligned individually with each base 212. Also, the base 212 and lid 214 pairs can be parted in a two step process whereby, the base material is cut with a thicker saw than the lid material. This results in each base 212 being slightly smaller than its lid 214, and the lid overlapping the base. The overlap provides convenient protection for electrical contacts that can be later formed on the lateral surfaces of the base 212.

It is to be understood that while the invention has been described above in conjunction with preferred exemplary embodiments, the description and examples are intended to illustrate and not limit the scope of the invention. The method described above and illustrated by the exemplary embodiments can be applied to the construction of many different types of devices. Thus, the scope of the invention should only be limited by the following claims.

We claim:

1. A method of fabricating an optical interconnect device, the optical interconnect device including optical-electrical components for interfacing an optical and an electrical signal, comprising:
    forming at least two alignment members on a substrate;
    affixing the substrate to a base material with at least a portion of the optical-electrical components therebetween; and
    segmenting the affixed substrate and base material into at least two portions of affixed substrate and base material, each portion having at least one alignment member.

2. The method of claim 1 wherein forming at least two alignment members comprises depositing material in the shape of at least two alignment members.

3. The method of claim 2 further comprising using a mold to shape the deposited material.

4. The method of claim 2 wherein the material is a metal deposited in a chemical vapor deposition process.

5. The method of claim 2 wherein the material is a curable material that bonds with the substrate as it hardens.

6. The method of claim 2 further comprising the step of depositing a preliminary layer on the substrate to promote adhesion of the at least two alignment members.

7. The method of claim 2 wherein forming the at least two alignment members on the substrate comprises affixing at least two prefabricated alignment members to the substrate.

8. The method of claim 2 wherein forming the at least two alignment members on the substrate comprises affixing an overlay having at least two alignment members thereon to the substrate.

9. The method of claim 2 further comprising etching the substrate using photolithograpy techniques to form at least one recess; and wherein the step of depositing material in the shape of at least two alignment members further comprises depositing material into the at least one recess in the shape of at least one of the at least two alignment members.

10. The method of claim 1 wherein forming at least two alignment members comprises molding the at least two alignment members together with the substrate.

11. The method of claim 1 wherein forming the at least two alignment members comprises machining the substrate to form the at least two alignment members.

12. The method of claim 1 where forming the at least two alignment members comprises etching the substrate using photolithography techniques to form the at least two alignment members.

13. A structure divisible into two or more optical communications devices, each of said two or more optical communications devices having at least one optical electrical device, and each optical communications device adapted to join with a connector of an optical cable, the structure comprising:

a first substrate divisible into at least two portions and having at least two optical electrical devices thereon;

a second substrate divisible into at least two portions and affixed to the first substrate with the at least two optical electrical devices positioned therebetween, the second substrate having at least two optical components thereon; and at least two alignment members formed on the second substrates, each alignment member adapted to interface with the connector to align the connector in relation to the second substrate, at least one of the at least two alignment members being formed on each portion of said second substrate.

14. The structure of claim 13, wherein at least one of the at least two alignment members is a prefabricated alignment member bonded to a portion of the second substrate.

15. The structure of claim 14 wherein at least one of the at least two alignment members is a microsphere.

16. The structure of claim 13 wherein at least one of the at least two alignment members is shaped from the second substrate.

17. The structure of claim 13 wherein at least one of the at least two alignment members is formed on an overlay and affixed to the second substrate.

18. The structure of claim 13 wherein at least a portion of the second substrate is transparent and the second substrate further comprises at least two optical devices formed in the second substrate.

* * * * *

UNITED STATES PATENT AND TRADEMARK OFFICE
CERTIFICATE OF CORRECTION

| | | |
|---|---|---|
| PATENT NO. | : 7,128,474 B2 | Page 1 of 1 |
| APPLICATION NO. | : 10/007494 | |
| DATED | : October 31, 2006 | |
| INVENTOR(S) | : Kirk S. Giboney | |

It is certified that error appears in the above-identified patent and that said Letters Patent is hereby corrected as shown below:

Title Page, Column 1 (Inventors), Line 1, delete "Mountain View,"
and insert -- Santa Rosa, --;

Title Page, Column 1 (Inventors), Line 2, delete "San Leandro,"
and insert -- Castro Valley --;

Column 6, Line 51-52, Claim 1, delete "alignment member."
and insert -- of the at least two alignment members. --;

Column 6, Line 58, Claim 4, before "material" insert -- deposited --;

Column 6, Line 60, Claim 5, before "material" insert -- deposited --;

Column 7, Line 6, Claim 9, delete "photolithograpy"
and insert -- photolithography --;

Column 8, Line 7, Claim 13, delete "substrates,"
and insert -- substrate, --.

Signed and Sealed this

Ninth Day of November, 2010

David J. Kappos
*Director of the United States Patent and Trademark Office*